United States Patent [19]
Noordhoff

[11] Patent Number: 5,552,043
[45] Date of Patent: Sep. 3, 1996

[54] WATER CONDITIONING SYSTEM

[75] Inventor: Samuel P. Noordhoff, Lincoln, Nebr.

[73] Assignee: Norland International, Inc., Lincoln, Nebr.

[21] Appl. No.: 213,713

[22] Filed: Mar. 16, 1994

[51] Int. Cl.⁶ .................................................. C02F 1/42
[52] U.S. Cl. .................................. 210/232; 210/284
[58] Field of Search ............................ 210/232, 252, 210/284, 262, 282

[56] References Cited

U.S. PATENT DOCUMENTS

| | | |
|---|---|---|
| 130,316 | 8/1872 | Robinson . |
| 176,593 | 4/1876 | Burke . |
| 606,592 | 6/1898 | Snell . |
| 613,048 | 10/1898 | Smith, Jr. . |
| 1,432,351 | 10/1922 | McGahan . |
| 2,369,915 | 2/1945 | Quinn .................................. 210/135 |
| 2,391,716 | 12/1945 | Koupal ................................. 210/793 |
| 4,025,426 | 5/1977 | Anderson et al. ..................... 210/284 |
| 4,383,920 | 5/1983 | Muller et al. ......................... 210/264 |
| 4,661,258 | 4/1987 | Phillips ................................. 210/661 |
| 4,855,046 | 8/1989 | Meehan ................................ 210/232 |
| 4,876,014 | 10/1989 | Malson ................................. 210/668 |

*Primary Examiner*—Ivars Cintins
*Attorney, Agent, or Firm*—Varnum, Riddering, Schmidt & Howlett LLP

[57] ABSTRACT

A conditioning system ideally suited for use under a wide variety of water softening conditions is disclosed. The conditioning system is well suited for the removal of calcium and magnesium ions from water although the system is also useful for numerous other conditioning applications. The conditioning system is formed from at least one water conditioner module having a fixed baffle and at least one removable baffle mounted therein. A suitable ion exchange resin is received in the housing and the modules are adapted to be stacked one upon another to accommodate various levels of impurity for the incoming water.

5 Claims, 3 Drawing Sheets

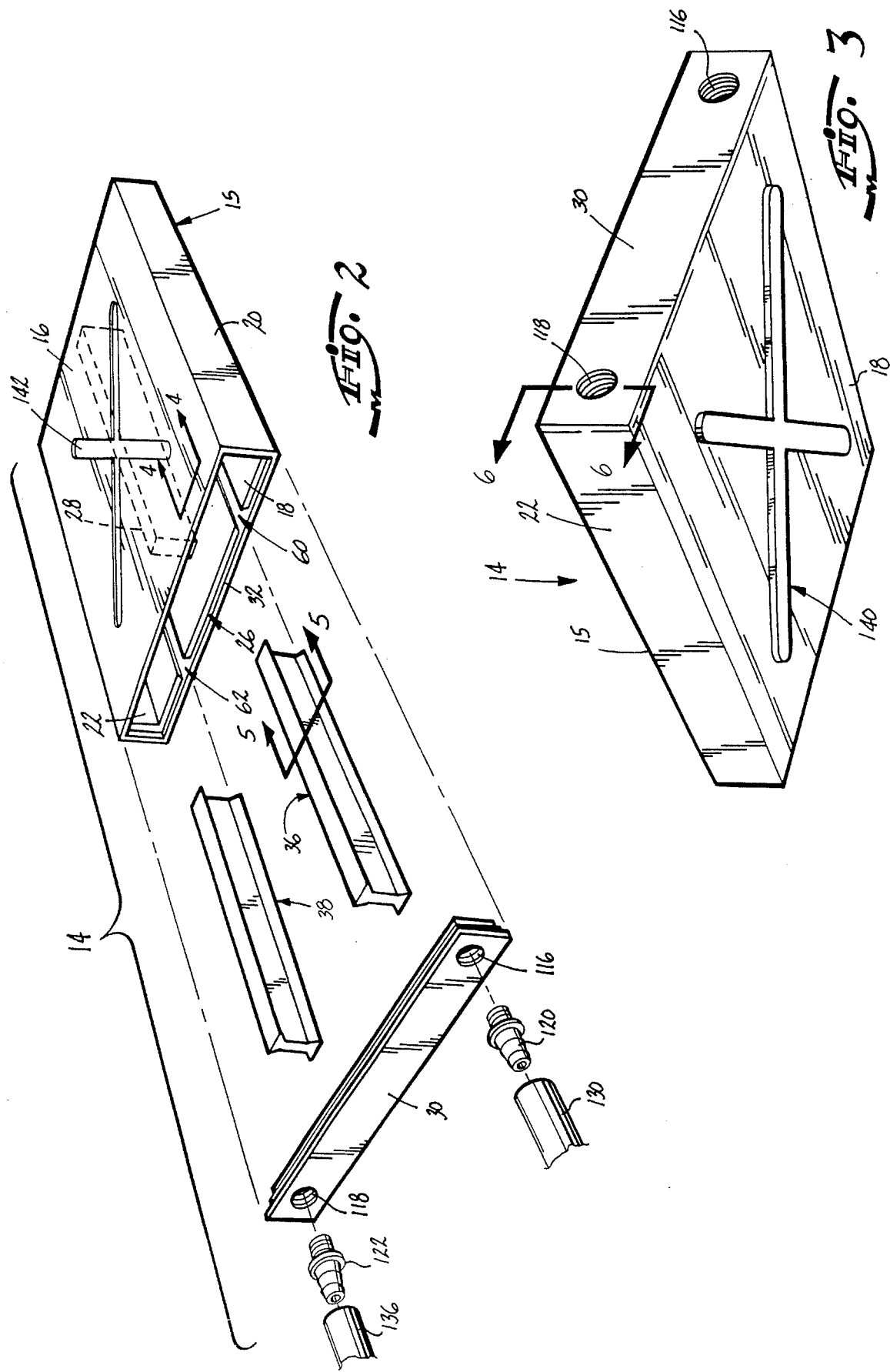

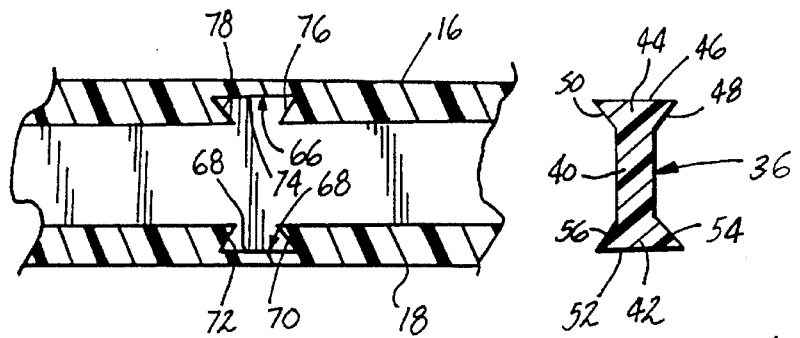
Fig. 4
Fig. 5
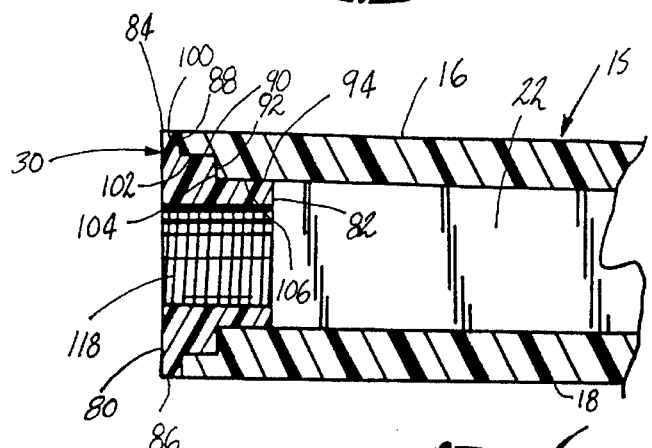
Fig. 6
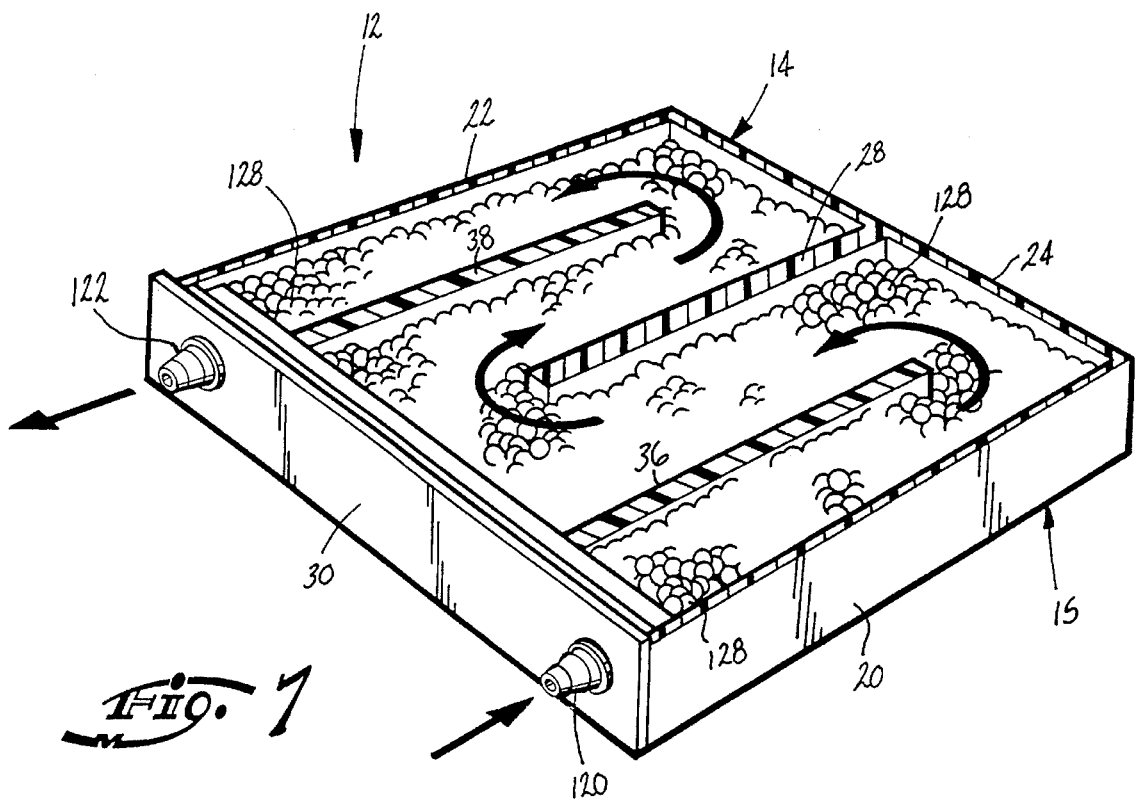
Fig. 7

WATER CONDITIONING SYSTEM

BACKGROUND OF THE INVENTION

1. Field of the Invention

This invention relates to a water conditioning system and, more particularly, to a water softening system which is used to remove calcium and magnesium ions from water and replace these ions with sodium ions.

2. Description of Related Art

The quality of water for residential and commercial uses has been an issue of increasing concern to water consumers. More and more residential water users are installing water conditioning systems to remove unwanted elements from water. Commercial water users are similarly concerned with increased water purity. Calcium and magnesium ions occur naturally in water and can produce undesirable scale and deposits on equipment, machinery and utensils which come into contact with the water. In addition, these ions can give water an undesirable taste. One method for removing the calcium and magnesium ions is to force the water through a bed of cation resin wherein the magnesium and calcium ions in the water are attracted to the resin and exchanged for ions of sodium or potassium. The magnesium and calcium ions are attracted to the resin beads which are embedded with the sodium or potassium ions. Examples of water conditioning systems based upon ion exchange are seen in U.S. Pat. No. 4,876,014 issued Oct. 24, 1989 to Malson and U.S. Pat. No. 4,661,258 issued Apr. 28, 1987 to Phillips.

Known water softener designs force water through a main chamber containing several baffles, or force the water through a main housing having a plurality of subchambers with filtering material contained therein. Examples of known filter housings are seen in U.S. Pat. No. 2,369,915 issued Feb. 20, 1945 to Quinn; U.S. Pat. No. 1,432,351 issued Oct. 17, 1922 to McGahan; U.S. Pat. No. 613,048 issued Oct. 25, 1898 to Smith, Jr.; U.S. Pat. No. 606,592 issued Jun. 28, 1898 to Snell; U.S. Pat. No. 176,593 issued Apr. 25, 1876 to Burke; and U.S. Pat. No. 130,316 issued Aug. 6, 1872 to Robinson.

One problem which each of the known water conditioning systems suffer from is access to an easily assembled housing which can withstand the internal pressure from the water being forced therethrough and also be easily manufactured from substantially inert materials.

SUMMARY OF INVENTION

The water conditioning system according to the invention overcomes the problems of the prior art in that the structure of the water conditioning system according to the invention can withstand sufficiently high internal water pressures and can be quickly and easily assembled. In addition, the water conditioning system according to the invention is easily adapted to be specifically tailored for the level of ion exchange necessary to remove the unwanted magnesium and calcium ions.

A water conditioning system according to the invention comprises a plurality of water conditioning modules, each of the modules comprising a housing having a hollow interior, an inlet in fluid communication with the hollow interior and an outlet in fluid communication with a hollow interior. Water conditioning material is received in the hollow interior of the housing. A first module of the plurality of modules and a second module of the plurality of modules are interconnected by a conduit such that water flows from the first to the second module.

In another embodiment, an interlocking projection is formed on the first module and an interlocking recess is formed on the second module, the recess being complementary to the projection. The first and second modules can be stacked one upon another through the interengagement of the projection and recess.

In another aspect, a water conditioning module according to the invention comprises a top wall, a bottom wall, opposed side walls, a rear wall and a front wall. The front wall has an access aperture formed therein to which a front panel is securely mounted. A water inlet is formed in one of the top, bottom, side, rear, front walls and front panel. Similarly, a water outlet is formed in one of the top, bottom, side, rear, front walls and front panel. A fixed support member is securely mounted to the top and bottom surfaces inside the hollow interior of the housing. The fixed support member restricts expansion and contraction of the top and bottom walls with respect to one another. At least one slidable support member is slidably received in the module such that the fixed support member and the at least one slidable support member cooperate to create a tortuous pathway through the housing between the water inlet and outlet.

In another embodiment, the slidable support member comprises a body portion having interlocking flanges formed on one of the top and bottom edges of the body portion. The width of the flange is greater than the width of the body portion of the slidable support member.

In still another embodiment, at least one channel is formed in at least one of the top and bottom surfaces, wherein the channel is complementary to the cross sectional shape of the interlocking flange.

In still another embodiment, the access aperture formed in the front wall has a rim extending around the perimeter of the access aperture. The rim has a stepped configuration of alternating substantially normal surfaces. The front panel is mounted to the access aperture to enclose the module. The perimeter of the front panel has a stepped configuration of alternating substantially normal surfaces complementary, in part, to the stepped configuration of the rim of the access aperture.

BRIEF DESCRIPTION OF THE DRAWINGS

The invention will now be described with reference to the drawings wherein:

FIG. 2 is an exploded view of a single water conditioning module according to the invention;

FIG. 3 is a lower perspective view of a single water conditioning module;

FIG. 4 is a cross sectional view of the locking channels of the water conditioning module taken along lines 4—4 of FIG. 2;

FIG. 5 is a cross sectional view of the removable baffle taken along line 5—5 of FIG. 2;

FIG. 6 is a detailed sectional view of the end wall mounted to the open end of the water conditioning module taken along line 6—6 of FIG. 3; and FIG. 7 is a perspective view of a single water conditioner unit with the top wall broken away to show the operation of one module of the water conditioning system according to the invention.

DESCRIPTION OF THE PREFERRED EMBODIMENTS

Figure 1:
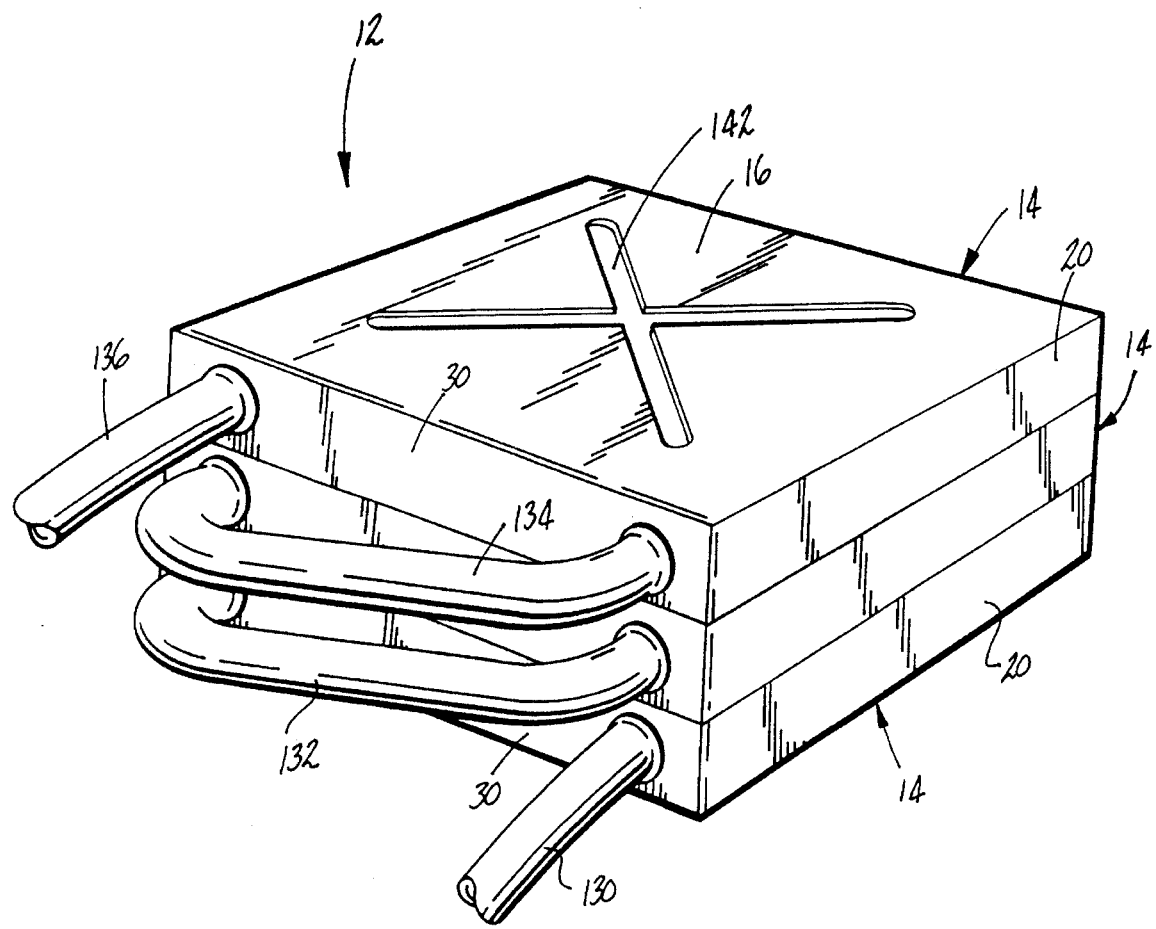
FIG. 1 is a perspective view of a water conditioning system according to the invention.

Referring now to the drawings and to FIGS. 1 and 2 in particular, a water conditioning system 12 according to the invention is shown. The water conditioning system 12 according to the invention comprises at least one water conditioner module 14 which comprises a housing 15 having a top wall 16, a bottom wall 18 (FIG. 3), a pair of opposed side walls 20, 22, a rear wall 24 (FIG. 7), a front end opening 26 opposed to the rear wall 24 and a front plate 30 mounted in the front end opening. Preferably, a fixed baffle 28 is securely mounted inside the housing 15 and extends forward from the rear wall 24 to a point a spaced distance from the front end opening 26. The top and bottom surfaces of the fixed baffle 28 are securely mounted to the interior surfaces of the top and bottom walls 16, 18 of the housing 15. Preferably, the housing 15 and fixed baffle 28 are integrally molded from a suitable thermoplastic material such as ABS plastic in an injection molding operation. With this structure, the fixed baffle 28 will provide support and rigidity to the opposed top and bottom walls 16, 18 of the housing 15.

As seen in FIGS. 2, 4 and 5, a pair of removable baffles 36, 38 are selectively received inside the housing 15 through the front end opening 26. The structure of the two baffles are identical to one another and therefore only one will be described in detail. The baffle is I-shaped in cross section and comprises a central body portion 40, an interlocking bottom flange 42 and an interlocking top flange 44. The top flange 44 is defined by a top surface 46 of the baffle 36 and a pair of locking surfaces 48, 50 which extend outwardly at an acute angle from the central body portion 40 of the baffle 36 to the top surface 46. The bottom flange 42 is identical to the top flange 44 in that the flange is defined by a bottom surface 52 and a pair of outwardly extending locking surfaces 54, 56.

The first and second removable baffles 36, 38 are slidably received in locking channels 60, 62 formed in the top and bottom walls 16, 18 of the housing 15. The channels 60, 62 are identical to one another and therefore the structure of only one channel will be discussed herein. The channel 60 is formed in the top and bottom wall 16, 18 of the housing 15 and extends from the front end opening to a spaced distance from the rear wall 24 of the housing 15. The channel 60 comprises a lower channel 64 and an upper channel 66. The lower channel 64 is defined by a bottom surface 68 and a pair of inwardly extending locking surfaces 70, 72. Similarly, the upper channel 66 is defined by a top surface 74 and a pair of inwardly extending locking surfaces 76, 78. The lower channel 64 is complementary to the bottom flange 42 of the removable baffle 36 and the upper channel 66 is complementary to the top flange 44 of the removable baffle 36. The baffle 36 is slidably received in the locking channel 60 and the engagement of the opposed surfaces of the top and bottom flanges 44, 42 with the upper and lower channels 66, 64 resists any movement of the top and bottom walls 16, 18 of the housing 15, relative to one another.

In assembling the water conditioner module 14 according to the invention, the removable baffles 36, 38 are first slidably received in the locking channels 60, 62 and then, as described below, a suitable water conditioning material is received in the hollow interior space of the housing 15. Next, front plate 30 is securely mounted to a rim 32 of the front end opening 26 of the housing 15. Preferably, the front plate 30 is formed of thermoplastic material, such as ABS. One conventional means for securing two thermoplastic articles such as the front plate 30 to the housing 15 is by ultrasonic welding. The particular structure of the front end opening 26 and the front plate 30 are particularly adapted to result in an unusually strong ultrasonic weld.

As seen in FIG. 6, the rim 32 of the front end opening 26 and the front plate 30 comprise a complementary stepped configuration which, when ultrasonically welded creates a weld of unexpected high strength and integrity due to the large surface area of contact between the two articles. The front plate 30 comprises a front wall 80, a rear wall 82, a top wall 84 and a bottom wall 86, intermediate the top and bottom walls 84, 86 and the rear wall 82 is a series of stepped surfaces. These surfaces preferably extend about the entire perimeter of the front plate 30 and therefore only the configuration between the top wall 84 and the rear wall 82 will be described in detail. The stepped configuration comprises a first vertical surface 88, a first horizontal surface 90, a second vertical surface 92 and a second horizontal surface 94 extending to the rear wall 82. The stepped configuration of the front plate 80 is complementary to the stepped configuration of the rim 32 of the front end opening 26 which comprises a first vertical surface 100, a first horizontal surface 102, a second vertical surface 104 and a second horizontal surface 106. When the front plate 30 is mounted to the rim 32, the top wall 84 of the front plate 30 is exposed, the first vertical surface 88 of the front plate 30 abuts the first vertical surface 100 of the rim 32, the first horizontal surface 90 of the front plate 30 abuts the first horizontal surface 102 of the rim 32, the second vertical surface 92 of the front plate 30 abuts the second vertical surface 104 of the rim 32 and the second horizontal surface 94 of the front plate 30 abuts the second horizontal surface 106 of the rim 32. As is seen in FIG. 2, the stepped configuration extends around the entire perimeter of the front end opening 26 and a complementary stepped configuration extends around the entire perimeter of the front plate 30.

The stepped interengagement of the front plate 30 and front end opening 26 creates a relatively large amount of surface area contact between the front plate 30 and rim 32. Therefore, when the front plate 30 is ultrasonically welded to the housing 15, the weld will be formed on the abutting vertical and horizontal surfaces of the front plate 30 and rim 32. This results in a significantly stronger weld than would otherwise be created by a conventional end to end butt weld.

The front plate 30 also comprises first and second threaded openings 116, 118 which are formed at opposite ends of the front plate 30. First and second threaded conventional fittings 120, 122 can be threadably received in the first and second openings 116, 118. The fittings 120, 122 are adapted to be connected to conventional water conduits such as plastic or elastomeric tubing.

As seen in FIG. 7, the housing 15 is adapted to receive a water conditioning material suitable to remove the undesired elements and ions from the water. Preferably, a rechargeable material is received in the housing such that the water conditioner module 14 can be used again and again for water conditioning. In the preferred embodiment, resin pellets 128 which are impregnated with sodium ions are received in the housing 15. An example of suitable pellets are commercially available from Sybron Chemicals, Inc. of Birmingham, N.J. and manufactured under the trade name C-249 resin. The C-249 resin is a cation resin and will give up the sodium ions contained within the resin in exchange for the calcium and magnesium ions in the water. The water conditioner module 14 according to the invention is also suitable for use with an anion resin or a mixture of cation and anion resins.

In use, water flows into the water conditioner module 14 through the first threaded fitting 120 at a pressure up to approximately 110 to 120 psi. The water flows through the resin pellets 128 received in the area defined by the side wall 20 and the first removable baffle 36. The water flows through the space defined by the end of the first baffle and the rear wall 24 and then flows through the space defined by the first removable baffle 36 and the fixed baffle 28. The water flows around the fixed baffle 28 past the front plate 30 to the space defined by the fixed baffle 28 and the second removable baffle 38. The water flows between the end of the second removable baffle 38 and the rear wall 24 into the space defined by the second removable baffle 38 and the side wall 22. Ultimately, the water will flow out of the module 14 through the second threaded fitting 122. The tortuous path defined by the module housing 15 and the baffles 28, 36, 38 creates a relatively long flow path for the water through the resin pellets 128 which fill the housing 15. This tortuous path maximizes the contact between the water and the resin pellets 128 resulting in highly efficient removal of ions from the water.

The water conditioning modules 14 according to the invention are suited for use with a wide range of levels of ions in the water. For example, in the event that the water to be conditioned has an unusually high amount of undesirable ions contained therein, a single water conditioner module 14 would likely remove all of the undesirable ions. However, the resin pellets within the module 14 would likely be quickly exhausted and need recharging as described further below. Therefore, to extend the operative cycle time of the water conditioning system for unusually high ion levels in the water, multiple water conditioning modules 14 can be stacked one upon another and interconnected one with another to effectively increase the source of resin pellets and thereby extend the time between recharging for the water conditioning system. As seen in FIG. 1, three water conditioning modules 14 are stacked one upon another. While this particular embodiment shows three modules, any number of modules suitable for the particular application can be utilized.

As seen in FIG. 1, the lower module 14 of the stock of modules receives water through an inlet conduit 130 received on a threaded fitting. The water passes through the module 14 as seen in FIG. 7 and exits the module through the outlet. The outlet of the lower module 14 is interconnected to the inlet of the second module 14 through a first connecting conduit 132. The water flows through the second module 14 in the same manner described above and is transferred to the third module 14 through a second connecting conduit 134. Ultimately, the water is discharged from the water conditioning system 12 through an outlet conduit 136.

The modules 14 can be quickly stacked and interconnected to one another simply by interconnecting a conduit between the inlets and outlets of the modules. The structure of the module housing 15 is ideally suited for stacking of the modules. As seen in FIG. 3, an X-shaped interlocking projection 140 is formed on the bottom wall 18 of the module housing 15. Similarly, the top wall 16 of the module housing 15 has an X-shaped interlocking recess 142 formed therein which is complementary to the interlocking projection 140 formed on the bottom wall 18. The modules 14 are easily stacked by placing one module 14 on top of another such that the interlocking projection 140 and recess 142 of the adjacent modules engage one another. In addition to providing easy stacking of the modules, the interlocking projection and recess 142 also add structural strength and rigidity to the top and bottom walls 16, 18 of the housing 15.

As noted above, the water pressure inside the module housing 15 during normal water conditioning operation of the system is approximately 110 to 120 psi. The internal pressure will attempt to expand the spacing between the top and bottom walls 16, 18 of the housing. This distortion of the housing 15 is resisted by the integrally molded fixed baffle 28 and the integrally molded projection 140 and recess 142 of the top and bottom walls 16, 18 of the housing 15. The expansion is further resisted by the interlocking connection between the removable baffles 36, 38 and the locking channels 60, 62. With each of these elements resisting the distortion of the housing 15, the housing can withstand a significantly higher internal pressure in the event of misuse or malfunction of the water conditioning system.

As described earlier, the front plate 30 is ultrasonically welded to the rim 32 of the front end opening 26 of the water conditioner housing 15. It is intended that once welded, there should be no further need to reopen the module 14 to exchange the filtering material contained therein. Therefore, a rechargeable filtering material is preferably received in the housing. As described above, the sodium ion containing resin will be depleted of sodium ions through the exchange of sodium ions with the calcium and magnesium ions in the water. Upon depletion of the sodium ions, the resin can be recharged by forcing a highly concentrated salt water solution through the module housing 15. Provided that the salt water solution passing therethrough has sufficiently high levels of sodium ions contained therein, the calcium and magnesium ions in the resin will be replaced with the excess of sodium ions. Upon removal of the calcium and magnesium ions, the module 14 can be used again as described above to remove the undesired ions from water.

The preferred embodiment described above is specifically directed to the removal of calcium and magnesium ions through the use of a sodium rich resin. However, the conditioning system according to the invention is also suitable for use with anion resin, a combination of cation and anion resin, activated carbon or a combination of any of these media.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A water conditioning system comprising:
    a plurality of water conditioning modules, each of the modules comprising;
        a housing having a substantially hollow interior;
        an inlet in fluid communication with the hollow interior;
        an outlet in fluid communication with the hollow interior; and
        water conditioning material received in the hollow interior of the housing;
    a first module of said plurality of modules, the first module having an interconnecting projection formed on a surface thereof, wherein the projection does not pierce the surface;

a second module of said plurality of modules, the second module having an interconnecting recess formed on a surface thereof, wherein the recess does not pierce the surface and is complementary in shape to the projection of the first module; and a conduit interconnecting the outlet of one of the first and second modules to the inlet of the other of the first and second modules;

wherein the first and second modules can be fluidly connected in series in response to varying levels of desired water conditioning and mechanically connected through the interengagement of the projection and recess.

2. A water conditioning system according to claim 1 wherein the water conditioning material comprises a sodium ion rich material which will give up sodium ions to the water passing through the conditioning system in exchange for calcium and magnesium ions.

3. A water conditioning system according to claim 2 wherein the water conditioning material comprises a rechargeable sodium ion rich material such that the water conditioning system can be reused by recharging the water conditioning material.

4. A water conditioning system according to claim 1 wherein the interconnecting projection comprises an X-shaped projection formed on the first module and the interconnecting recess comprises an X-shaped recess formed on the second module.

5. A water conditioning system according to claim 1 wherein the first module has an interconnecting recess formed on a surface thereof and the second module has an interconnecting projection formed on a surface thereof.

* * * * *